United States Patent Office 3,422,181
Patented Jan. 14, 1969

3,422,181
METHOD FOR HEAT SETTING OF STRETCH ORIENTED POLYGLYCOLIC ACID FILAMENT
Lester Daniel Chirgwin, Jr., Stamford, Conn., assignor to American Cyanamid Company, Stamford, Conn., a corporation of Maine
No Drawing. Filed May 23, 1966, Ser. No. 551,947
U.S. Cl. 264—345                3 Claims
Int. Cl. B29c *25/00;* D06c *9/00*

ABSTRACT OF THE DISCLOSURE

Melt spun polyglycolic acid filament after stretch orientation is dry heat set at a relative humidity not greater than about 20% at between 50° C. and 190° C. for between 5 hours and 5 minutes respectively. Sutures having improved implant strength retention are prepared from the heat treated filament.

---

This invention relates to a process for improving the strength retention and absorption rate of a polyglycolic acid filament to be used as a suture comprising subjecting said filament to dry heat at a temperature varying between about 50° C. and 190° C. for a period of time varying inversely between about 5 hours and 5 minutes. More particularly, this invention relates to the process for treating a filament to be used as a suture by heating said filament at a temperature between about 100° C. and 160° C. for a period of time varying inversely between about 2 hours and 30 minutes. The specifically preferred embodiment of the present invention resides in the treatment of the filament by heating at a temperature between about 130° C. and 140° C. for a period of time varying inversely between about 70 minutes and 50 minutes.

One of the objects of the present invention is to improve the strength retention of a polyglycolic acid filament to be used as a suture comprising subjecting said filament to a dry heat treatment at specified temperatures and for specified periods of time. A further object of the present invention is to improve the absorption rate when imbedded in living muscular tissue of a polyglycolic acid filament used as a suture by subjecting said filament to a dry heat treatment at certain temperatures for specified periods of time. These and other objects of the present invention will be discussed in greater detail hereinbelow.

Absorbable sutures in current use by the medical profession and veterinary profession for use in humans and lower animals are made from animal tissues, primarily of collagen. The sutures meeting with the greatest acceptance are generally formed by splitting animal intestines, separating the serosa layer, then twisting and chromacizing. Because of the nature of the tissues being used and natural biological variation, difficulty is sometimes encountered in getting uniformity of size, texture, strength and absorption rate. Any material of biologic origin may have antigenic characteristics that in at least some instances cause undersirable complications. Necessarily, the sutures from natural origin are short segments usually about five feet long. An absorbable synthetic suture and its method of preparation is shown in U.S. Patent No. 3,297,033 in the names of Edward Emil Schmitt and Rocco Albert Polistina, entitled "Surgical Sutures," which application is incorporated herein by reference. These surgical sutures have good knottability, good knot strength, good handleability and ready colorability and can be prepared in deniers of from about 1 to about 4,000. These sutures retain a high proportion of their original strength for at least three days when imbedded in living muscular tissue. On the other hand, these sutures are substantially completely absorbed in 90 days or less when imbedded in living muscular tissue and are substantially free from contaminants not absorbable by living muscular tissue.

Notwithstanding the highly desirable characteristics of the aforementioned sutures of the Schmitt and Polistina patent application which are prepared from polyglycolic acid, I have found that by subjecting said filaments, to be used ultimately as a suture, to a dry heat treatment that I can improve the strength retention and the absorption rate of the filament when used as a suture. The synthetic sutures of the polyglycolic acid which have not been subjected to the process of the present invention are apparently satisfactory in all respects, but it has been observed that these sutures sometimes lose tensile strength rapidly upon implantation in living muscular tissue. By the practice of the process of the present invention, the tensile strength of the filament when used as a suture is retained over a longer period of time. To accomplish this strength retention, the suture is exposed to dry heat in a temperature range varying between about 50° C. and 190° C. for periods of time ranging inversely from about five hours to about five minutes. This means that if the higher temperature is used, the shorter period of time is used, whereas when the lower temperature is used, the longer period of time is used. Preferably, the process of the present invention is conducted at a temperature varying between about 100° C. and 160° C. for periods of time varying inversely between about two hours and 30 minutes. For optimum results, the temperature is controlled between about 130° C. and 140° C. for periods of time varying inversely between about 70 minutes and 50 minutes. While carrying out the process of the present invention, the heating medium or chamber is controlled so that the relative humidity is comparatively low thereby providing a dry heat treatment. The relative humidity should be maintained at a level not greater than about 20% and, preferably, at a level not greater than about 10%.

The process for preparing the polyglycolic acid is a well-known process in the art as is shown in the U.S. Patent 2,668,162, Lowe, "Preparation of High Molecular Polyhydroxy Acetic Ester," and the U.S. Patent 2,676,945, Higgins, "Condensation Polymers of Hydroxy-acetic Acid." Each of these patents is incorporated herein by reference.

The polyglycolic acid is converted into a filament by a melt spinning technique. As the filament is formed, it is drawn by strengthing at about 55° C. in order to orient the polymer in the fiber or filament to about five times its original length in order to produce an initially strong, tough fiber. As the fiber is being formed, it is economically feasible to roll the filament onto a spool. When a given group of spools have been loaded with the filament they may then be subjected to the heat treatment of the present invention which causes the filament to be heated under constant length while on the spool.

If desired, one could carry out the process of the present invention in a continuous manner by subjecting the filament to the heat treatment of the present invention after the film has been formed in a melt spinning operation and has been stretched and oriented and then passed through a chamber heated to the selected temperature, said chamber being so constructed as to provide the required residence time in keeping with the selected temperature. The heat treating chamber will, of course, have its relative humidity so adjusted as to provide the level of humidity required in order to provide the dry heat treatment.

Reference is made to the U.S. application, Ser. No. 547,449, filed on or about May 4, 1966, in the names of Edward Emil Schmitt, Martin Epstein, and Rocco Albert Polistina, entitled, "Polymerization Process." Said application is incorporated herein by reference. In said application, there is disclosed and claimed a process for polymerizing a substantially pure glycolide composition with from about 0.05 to 1.5 mole percent based on the moles of said glycolide composition of an alcohol free of non-benzenoid unsaturation and free of any reactive groups other than alcoholic hydroxy groups and from about 0.0005% to about 0.0025%, by weight, based on the weight of said glycolide composition of $SnCl_2 \cdot 2H_2O$ at a temperature varying between about 210° C. and 245° C. for a period of time varying inversely between about 120 minutes and 50 minutes. When this polyglycolic acid material is prepared, it is spun from a melt through a spinnerette to provide the filament which is then stretched and oriented and is ready for the heat treatment of the present invention.

The following example is set forth in order to illustrate how the polymeric glycolic acid melt is prepared. This example is set forth primarily for the purpose of illustrating the process for preparing the polymeric melt in which all parts are parts, by weight, unless otherwise specified.

Process for preparing polyglycolic acid

A heavy walled glass tube having a bore of about 3/10" and sealed at one end is charged with 3 parts of substantially pure glycolide composition, 0.04 part of a 0.1% ether solution of $SnCl_2 \cdot 2H_2O$ (about 0.0013% of $$SnCl_2 \cdot 2H_2O$$

based on the weight of the substantially pure glycolide composition), 0.0166 part of lauryl alcohol (0.346 mole percent based on the moles of the substantially pure glycolide composition), and a magnetic steel ball 3/32" in diameter. The tube is evacuated and purged with argon. The tube is evacuated again to a vacuum of less than 1 mm. of Hg and the top is sealed. The reaction tube is placed in a vertical position in a closed glass chamber throughout which diethylene glycol is refluxed at about 222° C. The boiling point of the diethylene glycol is controlled by decreasing the pressure of the system. At periodic intervals after melting, the viscosity of the reaction mixture is measured by raising the steel ball by means of a magnet and measuring the rate of the fall of the ball in sec./in. Ninety minutes after the melt is first achieved, a viscosity of about 17,000 poises is attained, and after 120 minutes, the viscosity reaches about 19,000 poises.

The rate of the fall of the ball is a significant tool in determining the viscosity of the polymeric material and it is related to the molecular weight of the polymerized glycolide composition. The viscosity of the polymeric material may be varied between about 500 poises and 100,000 poises at the melt temperature.

The polymeric material thus prepared is spun from the melt through a spinnerette to provide a monofilament having a diameter of 1.5 mils and a calculated denier of about 15. The filament is wound onto a spool until the spool is substantially filled whereupon two additional spools are also filled by the same technique. The first spool only, was heat treated for one hour at 135° C. at a relative humidity of 10% under a constant load while on the spool. The other two spools were not subjected to this heat treatment: one was untreated, while the other was additionally stretched 1.1 times at 75° C. A sample of the heat treated filament had a straight load-to-break of 110 grams, while the untreated filament had a straight load-to-break of 105 grams, and the second restretched filament had a straight load-to-break of 140 grams. The heat treated filament had an elongation at the break of 54%, while the untreated filament had an elongation at break of 70%, while the restretched filament had an elongation at break of 41%. Braided sutures from these sets of monofilamens were prepared and were subjected to a plurality of tests before sterilization and after sterilization in ethylene oxide at room temperature. The various properties and values evolving from the tests are set forth hereinbelow in Table I, whch also draws a comparison with sterile 0-0 catgut and sterile 0-4 catgut.

TABLE I

| Sample | 1 Heat Set | 2 Untreated | 3 Restretched | Sterile 0-0 Catgut | Sterile 0-4 Catgut |
| --- | --- | --- | --- | --- | --- |
| Braided Sutures | N/S | N/S | N/S | | |
| Construction: | | | | | |
| Ends per Carrier | 2 | 2 | 2 | | |
| Carriers Used | 8 | 8 | 8 | | |
| Machine Type (Carriers) | 8 | 8 | 8 | | |
| Diameter, mils | 8.1/8.0 | 8.4/8.2 | 8.1/8.1 | 15.8-16.2 | 9.6-9.8 |
| Straight Tests: | | | | | |
| Pull, Pounds | 2.8/2.8 | 2.1/2.1 | 3.8/4.0 | 11.05 | 3.15 |
| Tensile Strength, p.s.i | 54,400/55,800 | 37,900/39,800 | 73,800/77,800 | 56,400 | 43,500 |
| Elong. at Break, percent | 20.0/20.2 | 25.4/22.3 | 22.2/23.2 | 22 | 23 |
| Knot Tests: | | | | | |
| Knot Pull, Pounds | 1.8/1.9 | 1.9/1.8 | 2.6/2.7 | 5.6 | 2.2-2.3 |
| Knot Tensile, p.s.i | 35,000/37,850 | 34,300/34,100 | 50,500/52,500 | 21,400-25,600 | 30,400-30,500 |
| Knot Elong., percent | 12.1/12.4 | 22.9/18.3 | 15.0/14.0 | 15 | 22 |
| Knot Tensile / Straight Tensile Ratio | .643 / .679 | .905 / .856 | .685 / .675 | .45 | .70 |
| Implant Strength Retention Tests: | | | | | |
| Straight Pull 0-Days (Original Strength) p.s.i | 55,800 | 39,800 | 77,800 | 56,400 | 43,500 |
| 7 Days in Rabbits, p.s.i | 36,800 | 15,839 | 23,210 | *17,800, 18,000 | |
| No. of Tests | 16 | 16 | 16 | 16, 16 | |
| Zero-Failures | None | None | None | None, None | |
| 15 Days in Rabbits, p.s.i | 7,760 | 0 | 0 | *3,183, 6,000 | |
| No. of Tests | 16 | 16 | 16 | 16, 16 | |
| Zero-Failures | 3 | 16 | 16 | 6, 1 | |

N=Non-sterile. S=Sterilized in ethylene oxide, room temperature. *=0-0 Catgut only used in comparative animal tests; results shown are for two separate reference runs.

I claim:

1. A process for improving the strength retention and absorption rate of a polyglycolic acid filament to be used as a suture comprising subjecting said filament to dry heat at a relative humidity not greater than about 20% and at a temperature varying between about 50° C. and 190° C. for a period of time varying inversely between about 5 hours and 5 minutes.

2. The process according to claim 1 in which the temperature is varied between about 100° C. and 160° C. for a period of time varying inversely between about 2 hours and 30 minutes.

3. The process according to claim 1 in which the temperature is varied between about 130° C. and 140° C. for a period of time varying inversely between about 70 minutes and 50 minutes.

References Cited

UNITED STATES PATENTS

| 2,676,945 | 4/1954 | Higgins | 260—78.3 |
| 3,297,033 | 1/1967 | Schmitt et al. | 128—335.5 |

JULIUS FROME, *Primary Examiner.*

A. KOECKERT, *Assistant Examiner.*

U.S. Cl. X.R.

264—290, 346; 128—335.5; 260—78.3